United States Patent
Gafvert

[19]

[11] Patent Number: 5,980,416
[45] Date of Patent: Nov. 9, 1999

[54] DIFFERENTIAL FOR A VEHICLE

[75] Inventor: Sven B. Gafvert, 16100 Hillcrest La., Eden Prairie, Minn. 55346

[73] Assignee: Sven B. Gafvert

[21] Appl. No.: 08/906,777

[22] Filed: Aug. 6, 1997

[51] Int. Cl.$^6$ .............................................. F16H 48/06
[52] U.S. Cl. ...................... 475/230; 475/248; 475/331
[58] Field of Search .............................. 475/248–252, 475/230, 346, 331

[56] References Cited

U.S. PATENT DOCUMENTS

| | | | |
|---|---|---|---|
| Re. 34,833 | 1/1995 | Hasegawa et al. .................. | 475/83 |
| 1,585,438 | 5/1926 | Taylor et al. ...................... | 475/230 |
| 2,424,942 | 7/1947 | Mynssen ........................... | 475/230 |
| 2,431,272 | 11/1947 | Mynssen et al. .................. | 475/230 |
| 3,665,787 | 5/1972 | Wilkinson ......................... | 74/674 |
| 3,673,889 | 7/1972 | Hauser ............................. | 74/713 |
| 4,004,471 | 1/1977 | Keske ........................... | 475/248 X |
| 4,086,826 | 5/1978 | von Kaler ........................ | 74/713 |
| 4,098,144 | 7/1978 | Besel et al. ..................... | 74/687 |
| 4,103,566 | 8/1978 | von Kaler et al. ................ | 74/701 |
| 4,221,138 | 9/1980 | Stewart et al. .................... | 74/607 |
| 4,232,569 | 11/1980 | Hauser et al. .................... | 74/701 |
| 4,271,725 | 6/1981 | Takao et al. ..................... | 74/730 |
| 4,334,719 | 6/1982 | Hauser et al. .................... | 308/121 |
| 4,339,965 | 7/1982 | Hauser et al. .................... | 74/607 |
| 4,388,842 | 6/1983 | Marcell .......................... | 74/710.5 |
| 4,713,982 | 12/1987 | Fluegel et al. .................... | 74/686 |
| 4,726,256 | 2/1988 | von Kaler et al. ................ | 74/689 |
| 4,738,332 | 4/1988 | Wright ............................ | 180/197 |
| 4,756,208 | 7/1988 | Hayashi et al. ................... | 74/700 |
| 4,856,368 | 8/1989 | Fujisaki et al. .................. | 74/606 R |
| 4,862,767 | 9/1989 | Hauser ............................ | 74/687 |
| 4,870,820 | 10/1989 | Nemoto ........................... | 60/487 |
| 4,903,545 | 2/1990 | Louis et al. ..................... | 74/606 R |
| 4,922,787 | 5/1990 | Fujisaki et al. .................. | 475/83 |
| 4,939,965 | 7/1990 | Bircumshaw ..................... | 82/113 |
| 4,942,780 | 7/1990 | Fujisaki et al. .................. | 475/83 |
| 4,969,319 | 11/1990 | Hutchison et al. ................. | 56/14.7 |
| 4,970,914 | 11/1990 | Takagi ............................ | 475/32 |
| 5,041,067 | 8/1991 | Hauser ............................ | 475/211 |
| 5,046,994 | 9/1991 | Hasagawa et al. ................. | 475/83 |
| 5,067,933 | 11/1991 | Hardesty et al. ................. | 475/32 |
| 5,078,659 | 1/1992 | von Kaler et al. ................ | 475/78 |
| 5,090,949 | 2/1992 | Thoma et al. .................... | 475/83 |
| 5,125,291 | 6/1992 | Makita et al. .................... | 74/730.1 |
| 5,129,867 | 7/1992 | Fredriksen et al. ............... | 475/79 |
| 5,156,577 | 10/1992 | Fredriksen et al. ............... | 475/74 |
| 5,201,692 | 4/1993 | Johnson et al. .................. | 475/74 |
| 5,230,519 | 7/1993 | Nishimura et al. ................ | 475/83 |
| 5,314,387 | 5/1994 | Hauser et al. .................... | 475/74 |
| 5,317,936 | 6/1994 | Shiba et al. ..................... | 74/606 R |
| 5,392,670 | 2/1995 | Hauser ............................ | 74/606 R |
| 5,447,028 | 9/1995 | Azuma et al. .................... | 60/487 |
| 5,501,640 | 3/1996 | Hauser et al. .................... | 475/83 |
| 5,526,892 | 6/1996 | Matsuda .......................... | 180/53.1 |
| 5,528,958 | 6/1996 | Hauser ............................ | 74/606 R |
| 5,569,110 | 10/1996 | Warren ............................ | 475/72 |
| 5,597,369 | 1/1997 | Brissenden et al. ............... | 475/89 |

*Primary Examiner*—Khoi Q. Ta
*Attorney, Agent, or Firm*—Schwegman, Lundberg, Woessner & Kluth PA

[57] ABSTRACT

A vehicle, such as a lawn mower or garden tractor, includes an engine attached to a frame. The frame includes several wheels including two driven wheels. A first axle shaft is attached to the first driven wheel. A second axle shaft attached to the second driven wheel. The vehicle has a transmission for transmitting power from the engine to the first axle shaft and the second axle shaft for driving the first and second wheels. The transmission includes a differential for accommodating different lengths of travel between said first wheel and said second wheel, such as when the vehicle makes a turn. The differential includes a ring gear supported by the first axle shaft and the second axle shaft. A first planet gear is supported on the first planet shaft. The first planet shaft is attached to the ring gear. Similarly, a second planet gear supported on a second planet shaft. The second planet shaft is also attached to the ring gear.

17 Claims, 6 Drawing Sheets

DIFFERENTIAL FOR A VEHICLE

FIELD OF THE INVENTION

The present invention relates generally to a drive system for a smaller vehicle. More particularly, the present invention relates to a differential used in a mechanical or hydrostatic transmission for a small vehicle, such as a lawn or garden tractor.

BACKGROUND OF THE INVENTION

A differential is a device that allows the driven wheels of a vehicle to turn at different speeds such as when making a turn. In rear wheel driven cars, the differential is known as the Rear End. There are essentially two types of differentials which can be described as heavy and light duty. The heavy duty, used by the automotive industry, is designed for heavy loads, high speeds and 1000's of hours of life. The light duty, used by the lawn and garden industry, is designed for light loads, low speeds and 100's of hours of life. Consequently, the designs of the two types are vastly different. The former requires accurate, well-supported steel gears, while the latter have simply, often highly unconventionally, supported powdered metal gears.

Generally, the differentials of the type used in lawn and garden tractors have the following components: a ring gear, two axle shafts, two planet gears, two bevel gears, a cross-shaft and various thrust washers and retaining rings. These parts are contained in and supported by a first housing portion and a second housing portion that may or may not have separate bearings.

The first and second housing portions mate to form a housing for the transmission. The differential is a part of the transmission. It should be noted that most of the time, the terminology for the components is as used above. Sometimes, however, the bevel gears are referred to as sun gears; the planet gears are referred to as planet pinions or merely pinion gears; and the ring gear is called the crown wheel.

Two types of transmissions are used in lawn and garden tractors, namely the mechanical and the more easily operated hydrostatic transmission (HST). Because of the high cost of the Hydrostatic transmission, most of the transmissions used in the past have been mechanical.

Over the last few years, however, the cost of the hydrostatic transmission has been substantially reduced. This lower cost and the ease of operation has resulted in the hydrostatic transimission gaining an increasingly greater share of the market. However, the hydrostatic transimission is less efficient than a mechanical transmission. To compensate for the inefficiencies, larger engines are required. The larger engine and inefficiencies translate into heat. Therefore, special features must be added to cool the hydrostatic transimission. In other words, the housing must be more complex with additional fins and added surface area to carry away the added heat generated. In addition, cooling fans must be added to force ambient air around the housing to adequately cool the unit.

Common types of differentials used in mechanical transmissions are very inefficient because the ring gear is supported on the Major Diameter (M.D.), or on cylindrical surfaces at a large diameter, by a cavity in the housing which may or may not have an intermediate member of steel. In any case, the friction is high and the diameter large. As Horsepower (HP) is proportional to Torque (T) and Speed (N), and as T is proportional to the gear Force (F), Radius (R) to the supporting surface, and Friction (u), Horsepower Loss (HPL) is proportional to N, F, R, and u. For purposes of comparison N and F are constants and consequently HPL is proportional to R and u, which, in the case of the more commonly used differentials are both very large. Additionally, as the ring gear floats in the housing cavity, it continuously bumps up against the housing at a large diameter further increasing the HPL.

As the hydrostatic transmission is a rather inefficient device, any inefficiencies downstream of the hydrostatic transmission further aggravates the problem of cooling the hydrostatic transmission because the hydraulic units of the hydrostatic transmission must work that much harder. Consequently, hydrostatic transmissions as described in U.S. Pat. Nos. 4,339,965 and 5,447,028 have tried to address the problem of high differential inefficiencies by supporting the ring gear by a highly finished shaft of small diameter.

The construction of the hydrostatic transmission of U.S. Pat. No. 4,339,965 still allows the gear to float laterally. The cross-shaft is also expensive to produce. Additionally, the necessary clearances between the cross-shaft and the ring gear will, over time, cause wear and shortened life of the Hydrostatic transmission.

The construction of the hydrostatic transmission of U.S. Pat. No. 5,447,028 overcomes some of the problems of U.S. Pat. No. 4,339,965 mentioned above, but at increased cost. More parts and special assembly techniques are probably required to assure proper gear alignment of this hydrostatic transmission.

Therefore, there is a need for a low cost more efficient differential that can be used as part of either a mechanical or a hydrostatic transmission. A more efficient differential will have less wear and will last longer while not producing heat as a result of friction between the various components and the housing of the transmission. In addition, there is also a need for a transmission that has fewer parts and is simple to assemble and manufacture. There is a further need for a transmission that can be made less inexpensively.

SUMMARY OF THE INVENTION

A vehicle, such as a lawn mower or garden tractor, includes an engine attached to a frame. The frame includes several wheels including two driven wheels. A first axle shaft is attached to the first driven wheel. A second axle shaft is attach ed to the second driven wheel. The vehicle has a transmission for transmitting power from the engine to the first axle shaft and the second axle shaft for driving the first and second wheels. The transmission includes a differential for accommodating different lengths of travel between said first wheel and said second wheel, such as when the vehicle makes a turn. The differential includes a ring gear supported by the first axle shaft and the second axle shaft. The ring gear has a web within the ring. The ring gear includes a central opening in the web. A first planet gear is supported on the first planet shaft. Similarly, a second planet gear is supported on a second planet shaft. The web of the ring gear has a second opening which accommodates the first planet gear and the first planet shaft. The second opening has radial slots which engage the ends of the first planet shaft. The web of the ring gear has a third opening which accommodates the second planet gear and the second planet shaft. The third opening has radial slots which engage the ends of the second planet shaft. The radial slots of the web associated with the second and third openings do not necessarily extend through the web.

Supporting the ring gear directly by the first and second axle shafts increases the efficiency of the differential and hence the transmission because of better alignment of parts, and the small diameter of the supporting axle shafts compared to those differentials using the major, or close to the major diameter, of the ring gear for support. By supporting the ring gear, movement of the ring gear is essentially eliminated. Limiting the movement of the ring gear by supporting it with the axle shafts, also limits the amount of motion of the bevel gears with respect to the planet or pinion gears. Limiting this motion lessens wear and prolongs life in addition to increasing efficiency. In addition, the web in the ring gear helps with maintaining a geometric shape when the ring gear is heat treated. The more efficient differential has less wear and lasts longer while not producing as much heat from friction between the various components of the differential and friction between the ring gear and the housing of the transmission. The positive support differential also has few parts and is simple to manufacture and assemble which allows the differential of the transmission to be made less expensively.

BRIEF DESCRIPTION OF THE DRAWINGS

While the novel features of the invention are set forth with particularity in the appended claims, the invention, both as to organization and content, will be better understood and appreciated from the following detailed description taken in conjunction with the drawings, in which:

DESCRIPTION OF THE EMBODIMENT

In the following detailed description of the embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined only by the appended claims.

Figure 1:
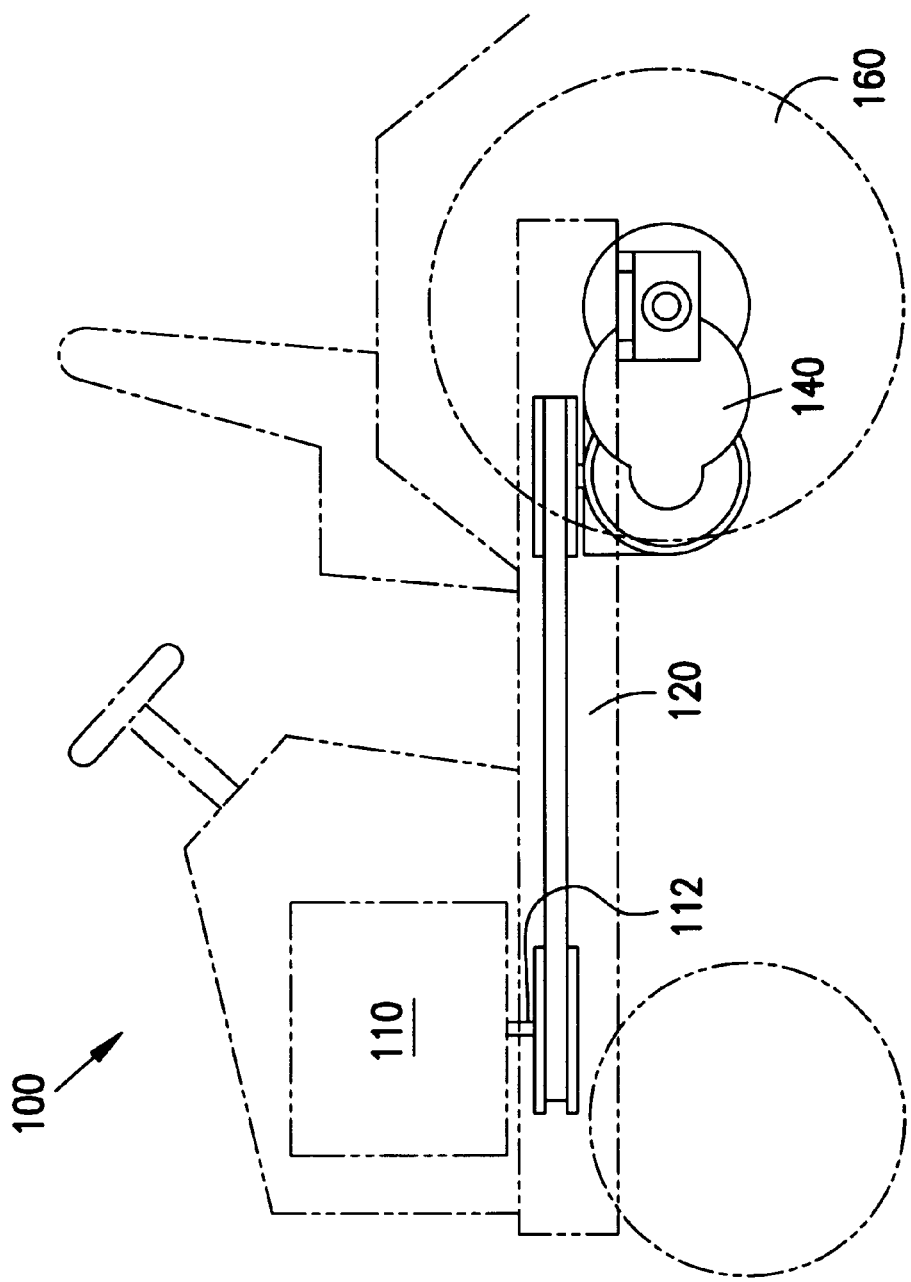
FIG. 1 is a side view of a vehicle having an engine and a transmission with a differential.
Figure 2:
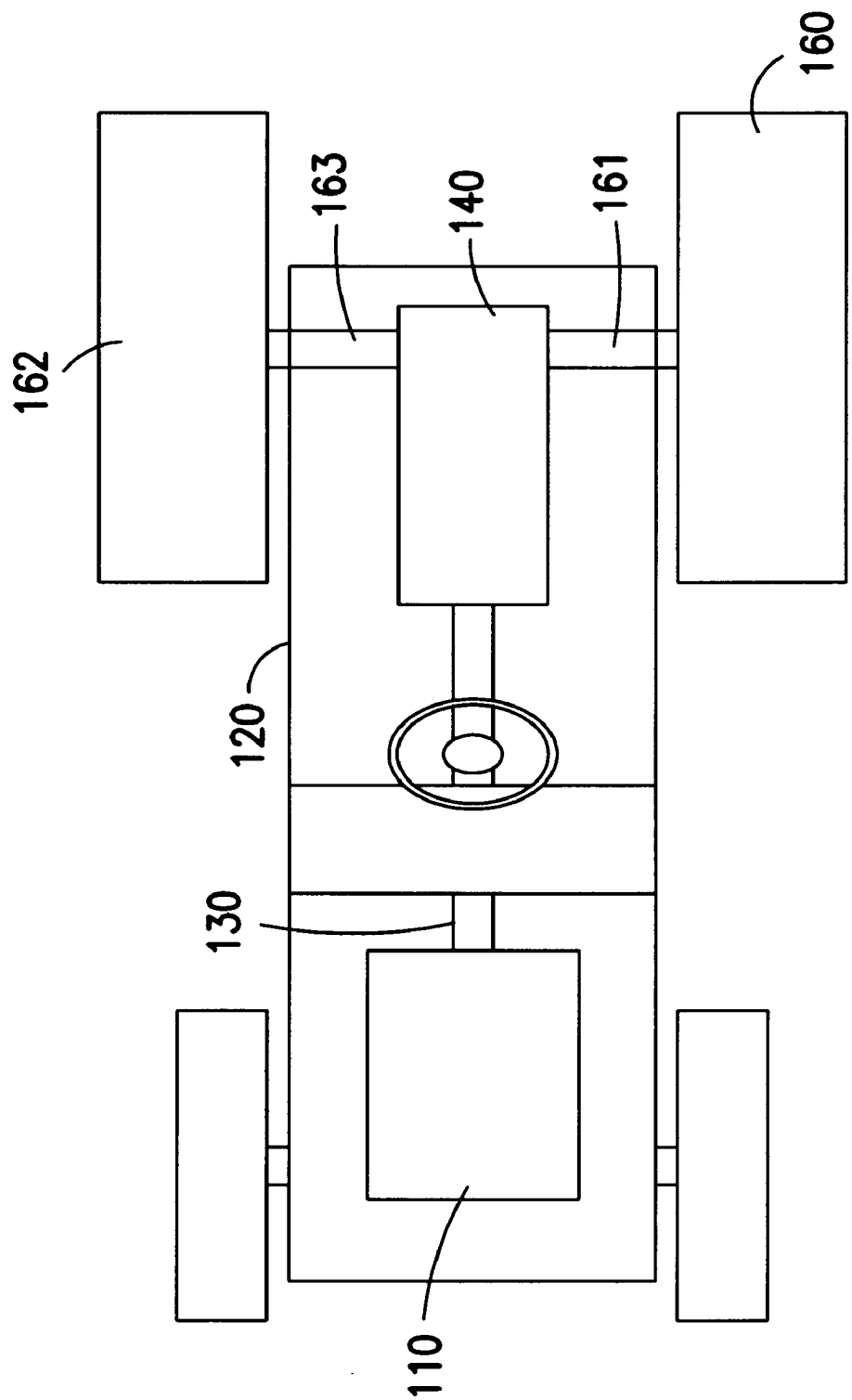
FIG. 2 is a top view of a vehicle having an engine and a transmission with a differential.

FIG. 1 is a side view of a vehicle 100, such as a tractor, which includes an engine 110 mounted to a frame 120. FIG. 2 shows a top view of the vehicle 100. Referring now to both figures, the engine 110 includes a drive shaft 112 which turns a V-belt or fan belt 130. The V-belt or fan belt drives a sheave which in turn drives a transmission 140. The transmission 140 includes a differential (not shown) which is used to drive an axle shaft 161 to which wheel 160 is attached, and an axle shaft 163 to which the driven wheel 162 is attached. The differential (not shown) allows power to be transmitted to both wheels during a turn when one of the wheels will travel a greater distance. For example, the outer driving wheel is the wheel that is on the outer radius of the turn. For example, when an operator makes a right-hand turn while the vehicle is being moved forward, the wheel 162 on the right-hand side of the vehicle is the inner driving wheel since it travels the least distance during the turn. The wheel 160 on the left side is the outer driving wheel since it must travel a greater distance than the right-hand wheel 162 during the turn. When the operator turns the other way or makes a left-hand turn, the inner driving wheel 160 is the left-hand wheel and the outer driving wheel 162 is the right-hand wheel. The differential allows power to be transmitted to both the inner and outer driving wheels despite the fact that one of the wheels moves a greater distance during a turn than the other wheel.

Figure 3A:
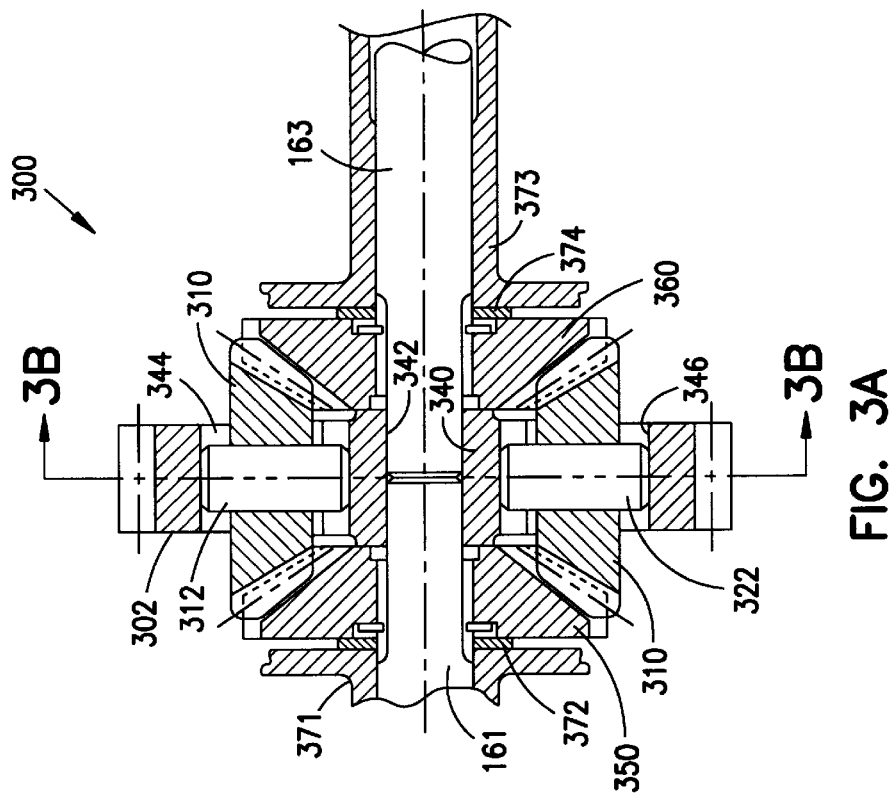
FIG. 3A is a cut away cross-sectional view of a first embodiment of the positive support differential.
Figure 3B:
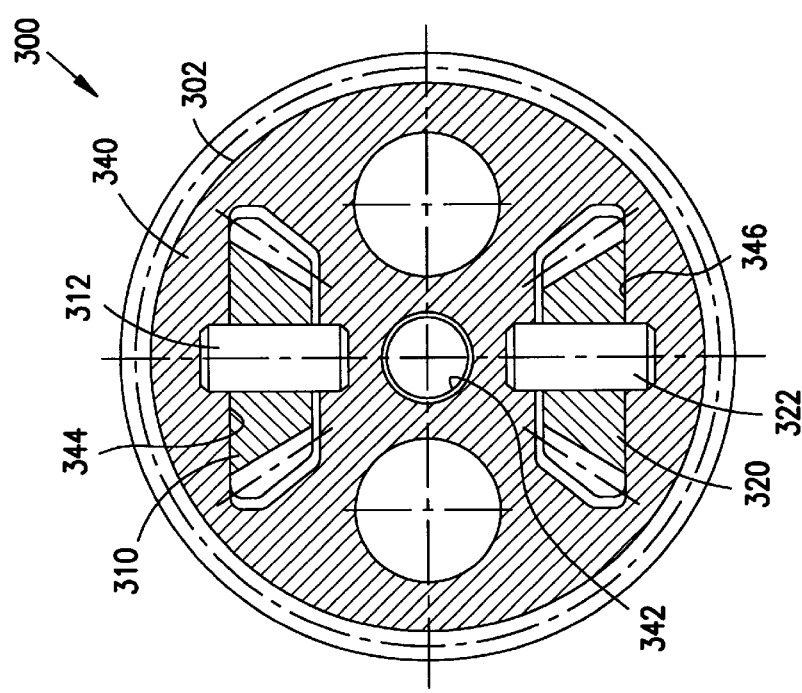
FIG. 3B is a cross-sectional side view of a first embodiment of the positive support differential along line 3B—3B in FIG. 3A.

FIG. 3A is a cutaway cross-sectional view of a first embodiment of the positive support differential 300. FIG. 3B is a cutaway side view taken along line 3B—3B in FIG. 3A of the positive support differential 300. Now referring to both FIGS. 3A and 3B, the details of the positive support differential 300 will be discussed. The positive support differential 300 includes a ring gear 302, a first planet gear 310 and a second planet gear 320. Planet gears 310 and 320 are sometimes referred to as pinions or planet pinions. The positive support differential 300 also includes a first bevel gear 350 attached to the first axle shaft 161 and a second bevel gear 360 attached to the second axle shaft 163. The ring gear 302 includes a web 340 or solid portion which is located within the ring gear 302. The web 340 includes a central opening 342. The central opening 342 is dimensioned so that the ends of axle shafts 161 and 163 fit within the opening 342. The central opening 342 mates with the axle shafts 161 and 163. The axle shafts 161 and 163 support the ring gear 302. Supporting the ring gear in this manner provides a higher efficiency differential 300 when compared to most other differential designs of the prior art as discussed in the Background section of this document. The web 340 also has openings 344 and 346 therein. The opening 344 includes a first portion for allowing the first planet gear 310 to rotate and a second portion, including two radial slot, for capturing or engaging a first planet shaft or pin 312. Similarly, the opening 346 has a first portion in which the second planetary gear 320 is able to rotate. In addition, the opening 346 has a second portion which has two radial slots which engage a pin or the ends of the second planet shaft 322 on which the second planetary gear 320 rotates. Additional openings may be placed in the web 340 to reduce its weight and therefore reduce the cost associated with the rotating ring gear 302 of the positive support differential 300. It should be noted that the central opening 342 is one opening that is necessary to the operation of the positive support differential 300. Openings 344 and 346 are also necessary to the operation of the positive support differential 300. In addition, planet shafts 312 and 322 are positioned along two radii of the ring gear 302. More specifically, the planet shafts 312 and 322 are positioned along a diameter of the ring gear 302. Using a first planet shaft or pin 312 and a second planet shaft or pin 322 allows for support of the planetary gears 310 and 322, respectively, and also allows the central opening 342 to exist. In the past, many of the designs incorporated an elongated cross support which supported both of the planetary gears of a differential.

The first axle shaft 161 is supported by a housing half member 371 and the second axle shaft 163 is supported by a housing half member 373. The housing half members 371 and 373 can be part of either a vertically split or horizontally split housing or gear case. The bevel gear 350 is attached to the first axle shaft 161 near the end that engages or passes into the opening 342 of the ring gear 302. The first bevel gear 350 is spaced so that a portion of the bevel gear may bear against the area of the web near the opening 342. The web 342 has a thickness so that the bevel gear 350 properly engages the first planet gear 310 and the second planet gear 320. A thrust washer 372 is positioned between the first bevel gear 350 and the housing 371 to further provide a proper spacing of the first bevel gear 350 so that it properly engages the first planet gear 310 and the second planet gear 320. One of the thrust washers 372 or 374 may serve as a shim to assure proper spacing. A separate shim may also be used in addition to the thrust washers 372 and 374. On the other side of the positive support differential 300, the second bevel gear 360 is positioned near the end of the second axle shaft 163 such that the inner portion of the bevel gear 360 may bear against a portion of the web 340 near the opening 342. The bevel gear 360 is positioned so that it properly engages the first planetary gear 310 and the second planetary gear 320 of the positive support differential 300. A thrust washer 374 is positioned between the second bevel gear 360 and the housing 373 for the second axle shaft 163. The thrust washer 374 further ensures the proper spacing of the bevel gear 360 on the second axle shaft 163 so that the bevel gear 360 properly engages the first planet gear 310 and the second planetary gear 320. The bevel gears 350 and 360 are slip fit over splines on their respective axle shafts 161, 163.

When the positive support differential 300 is used in a relatively low horsepower vehicle, most of the gears of the positive support differential 300 are formed using powder metallurgy. In other words, the ring gear 302, the first planetary gear 310, the second planetary gear 320, the first bevel gear 350 and the second bevel gear 360 can all be made from powdered metal. The powdered metal process provides for an accurate and inexpensive gear and also provides gears that do not need additional machining after having been formed. One advantage of the positive support differential 300 is that the ring gear 302 can be manufactured with fewer rejected parts. In powder metallurgy, powdered metal is typically put into a mold and then a huge hydraulic press is used to form the powdered metal into a gear. After the gear has been formed, the part is sintered and heat treated so that it has acceptable strength and wear characteristics.

In the past, most ring gears did not have a web. As a result of the sintering and subsequent heat treating processes, the ring gears tend to go out-of-round or otherwise distort and the parts would have to be rejected. As a result of having the web 340 in the ring gear 302 of the positive support differential 300, the sintering and heat treating of the ring gear 302 is less prone to distortion and therefore the number of rejected parts from a production run is lower. It should be noted that this differential is not necessarily limited to use in low power applications such as lawn tractors. The same design can be used to transmit more power, however, the various gears of the positive support differential would probably have to be machined from steel and undergo heat treatment.

In operation, the positive support differential 300 is much more efficient than many of the differentials discussed in the Background section of the invention. The efficiency of the positive support differential is a direct result of the ring gear 302 being supported by the ends of the two axle shafts 161 and 163. Due in part to tolerances and also in part due to lack of a positive support, there could be a large amount of relative motion between the planetary gears and the bevel gears.

Advantageously, the positive support differential 300 maintains the position of the ring gear 302 such that the ring gear 302 does not have to, or will not, contact the casing or housing in which it operates. In addition, this maintaining of the position via the support from the first axle shaft 161 and the second axle shaft 163 eliminates much of the movement between the planetary gears 310 and 320 and the bevel gears 350 and 360. As a result, the efficiency of the positive support differential is higher when compared to most other differentials. In addition, the positive support differential 300 is relatively easy to manufacture and assemble. The differential can be assembled easily in both vertically split and horizontally split casings or housings.

It should be noted that the first and second planet shaft or pins 312 and 322 are hardened and highly finished. The planet shafts 312 and 322 are simple parts which can be purchased at an inexpensive price. It should also be noted that the slots for accommodating the planet shaft need not extend all the way through the web of the ring gear. It is contemplated that the slots could be stops and that plugs or retainers could be used to fill a partial opening.

Figure 4A:
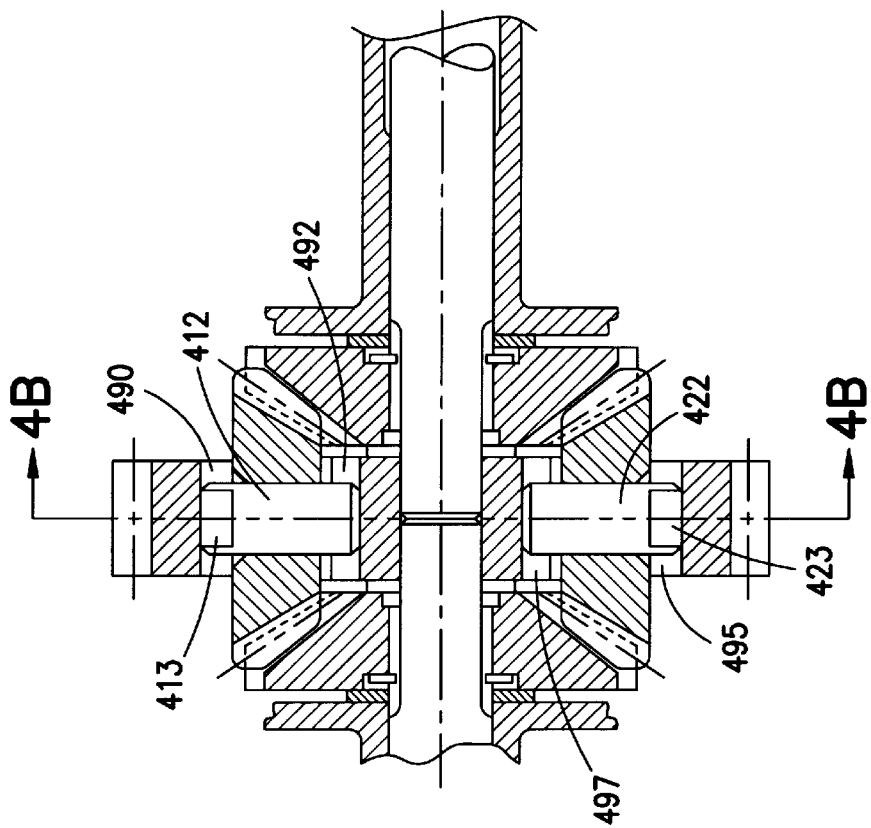
FIG. 4A is a cut away cross-sectional view of a variation of the first embodiment of the positive support differential in which the planet shaft or pin of the planet gear includes an anti-rotation tang.
Figure 4B:
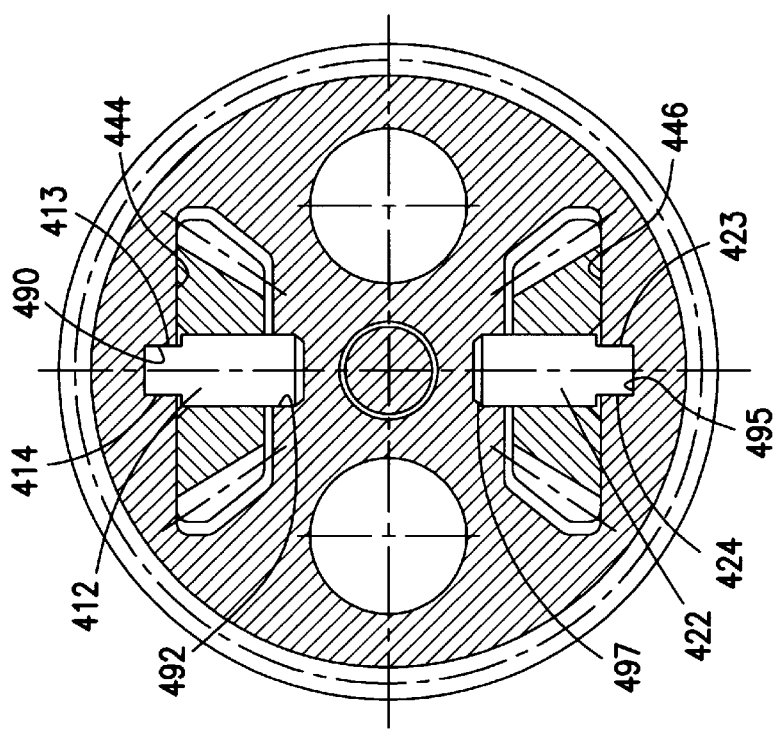
FIG. 4B is a cross-sectional side view of a first embodiment of the positive support differential along line 4B—4B in FIG. 4A.

FIG. 4A is a cutaway cross-sectional view of a variation of the first embodiment of the positive support differential 300. FIG. 4B is a side view of the positive support differential shown in FIG. 4A along line 4B—4B. It should be noted that many of the elements of the positive support differential 300 shown in FIGS. 4A and 4B are the same or substantially identical to the parts shown in FIGS. 3A and 3B. Rather than include a lengthy description describing the same parts, the discussion of FIGS. 4A and 4B will be limited to pointing out the difference in this variation and the embodiment shown in FIGS. 3A and 3B. The difference between the positive support differential shown in FIGS. 3A and 3B and the positive support differential shown in FIGS. 4A and 4B relates to the planet shafts 412 and 422. In the embodiment shown, one end of the planet shaft 412 is provided with a first flat 413 and a second flat 414. The flats 413 and 414 are sometimes referred to as tangs. The flats or tangs 413 and 414 are located on one end of the pin 412 and prevent rotation of the pin 412. The pin 422 is also provided with a first flat 423 and a second flat 424. Flats 423 and 424 are located on one end of the pin or planet shaft 422 and prevent rotation of the planet shaft or pin 422. The web 340 has openings 444 and 446 which accommodate the assembled planet shafts 412 and 422. The opening 444 has a second portion with two slots 490, 492 for engaging the ends of the planet shaft 412. The second portion with two slots may or may not extend through the web. The slot 490 engages the flats 413 and 414 to prevent rotation of pin 412. Slot 492 engages the other end of the pin 412 during its operation. Similarly, the planet shaft or pin 422 has one end with flats 423 and 424. Slot 495 of the opening 446 engages the end with flats. Slot 497 engages the other end of the pin or planet shaft 422. The flats 423 and 424 prevent rotation of the pin or planet shaft 422. It should be noted that in order to reduce contact stress and consequently wear, the pins 412, 422 can be provided with flats or tangs on both ends.

Figure 5A:
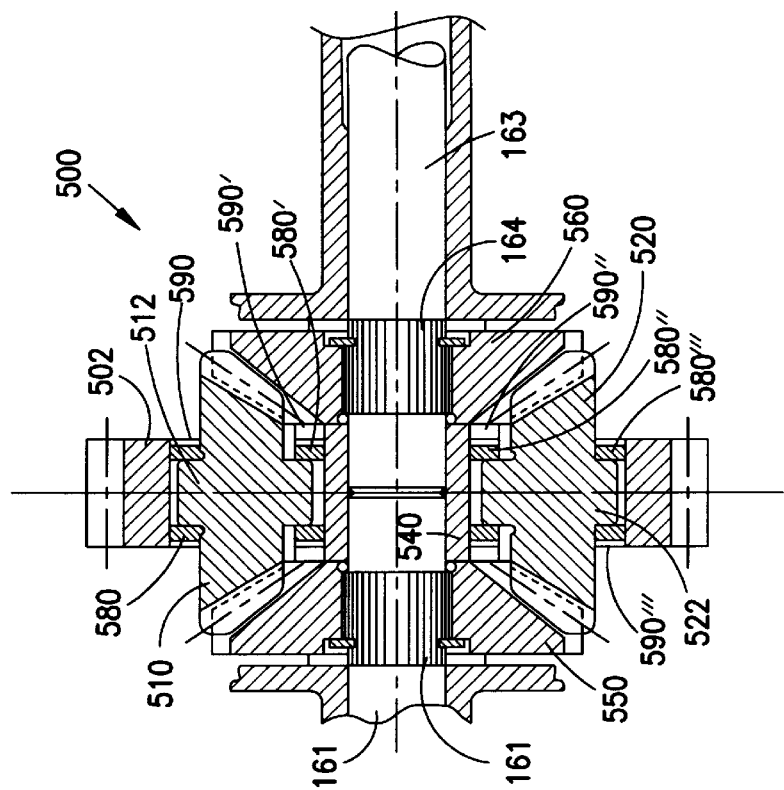
FIG. 5A is a cut away cross-sectional view of a second embodiment of the positive support differential.
Figure 5C:
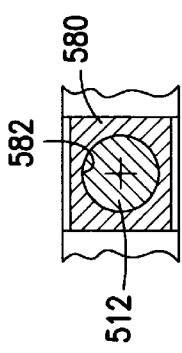
FIG. 5C is a cut away sectional view of a retainer for the integral pin of the pinion or planet gear of the second embodiment.
Figure 5B:
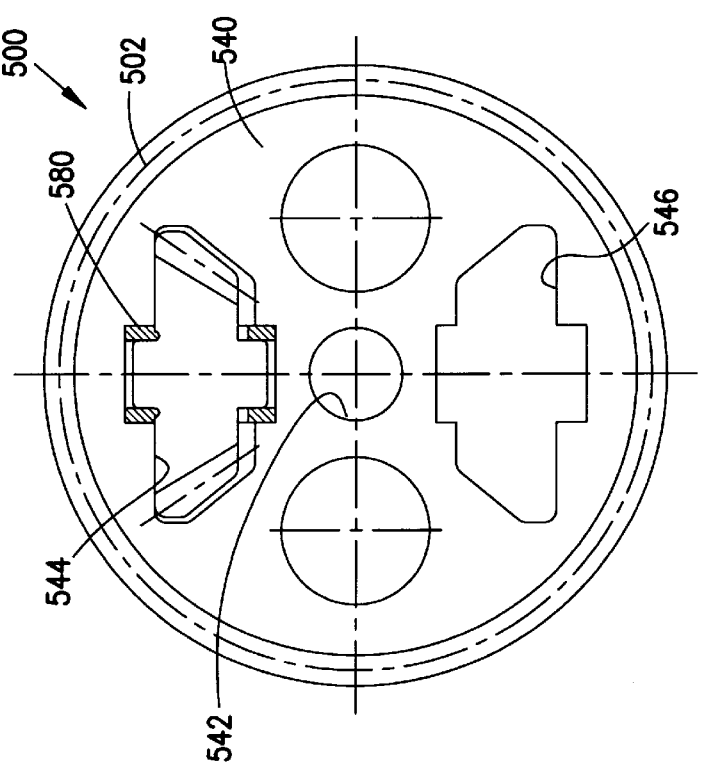
FIG. 5B is a cut away side view taken along line 5B—5B in FIG. 5A of a second embodiment of the positive support differential.

FIG. 5A is a cutaway cross-sectional view of a second embodiment of a positive support differential 500. FIG. 5B is a cutaway side view taken along line 5B—5B in FIG. 5A of the positive support differential 500. FIG. 5C is a section through a retainer 580 and pin 512 used in the positive support differential 500. Now using FIGS. 5A, 5B and 5C, the positive support differential 500 will be discussed. The positive support differential 500 includes a ring gear 502 which has a web 540. The positive support differential also includes a first planetary gear 510 and a second planetary gear 520 as well as a first bevel gear 550 and a second bevel gear 560.

The first bevel gear 510 includes an integral shaft 512 which is formed as part of the first planetary gear 510. Similarly, formed as part of the second planetary gear 520 is an integral shaft 522. The first axle shaft 161 is provided with a spline 162 upon which the first bevel gear 550 is engaged. Similarly, the second axle shaft 163 is provided with a spline 164 to which the second bevel gear 560 is engaged. The splines 162 and 164 are positioned away from the ends of the axle shafts 161 and 163. The ends of the axle shafts 161 and 163 fit within an opening 542 in the web 540 of the ring gear 502. The bevel gears 550 and 560 bear against a hub or extended portion of the web 540 near the opening 542. The hubs or extended portion may be replaced with spacers. The thickness of the web near the opening 542 is dimensioned so that the bevel gears 550 and 560 properly engage the planet gears 510 and 520 of the positive support differential 500. Shims could also be used to assure proper spacing or backlash between the gears. The first planetary gear 510 and the second planetary gear 520 are held in slots in openings 544 and 546 in the ring gear 502 with the aid of the retainer 580.

As best shown in FIG. 5C, the retainer 580 is a square metal piece that has an opening 582 therein. The opening 582 is circular and accommodates or engages the integral shaft of the planetary gears 510 and 520. The openings 544 and 546 in the ring gear 502 accommodate the planetary gears 510 and 520 as well as the retainer 580. The retainer 580 can be made of powdered metal which is specially treated to provide a hardened wear surface. The retainer 580 fits into slots, such as slots 590, 590', 590" and 590''', within the opening 544 as well as within the opening 546 in the web 540 of the ring gear 502. As shown in FIG. 5A, two retainers 580 and 580' are used to hold the first planet 510 in place in slots 590 and 590'. Two more retainers 580" and 580''' are used to hold the second planet 520 in place within slots 590" and 590''' of opening 546.

Assembly of the positive support differential 500 is straightforward. The positive support differential 500 can be assembled for use in a vertically split housing or for use in a horizontally split housing. The end of the second axle shaft 163 is also placed into the opening 542 of the ring gear 502 and the bevel gear 560 engages the planet gear 510 and the planet gear 520 to complete the assembly. Various thrust washers and shims are used to provide wear surfaces and also maintain the spacing of the assembly. Shims are probably used by all manufacturers to control gear backlash, because of the unique construction of the positive support differential 300, 500, this backlash can be better controlled than in most transmissions, resulting in smoother operation.

The end result is a very efficient differential which results from the positive support gained by placing the two axle shafts 161 and 163 in the opening 542 of the ring gear 502. The support of the axle shafts 161 and 163 positively positions the ring gear 502 so that it does not have to impact or contact the case in which it rotates. In addition, the more accurate positioning cuts down on the amount of movement between the bevel gears 540 and 560 and the pinion or planet gears 510 and 520. By eliminating or reducing these movements between the various gears as well as the movement of the ring gear 502, the efficiency is increased. In addition, manufacture and assembly is very straightforward and easy since there are very few parts.

Figure 6:
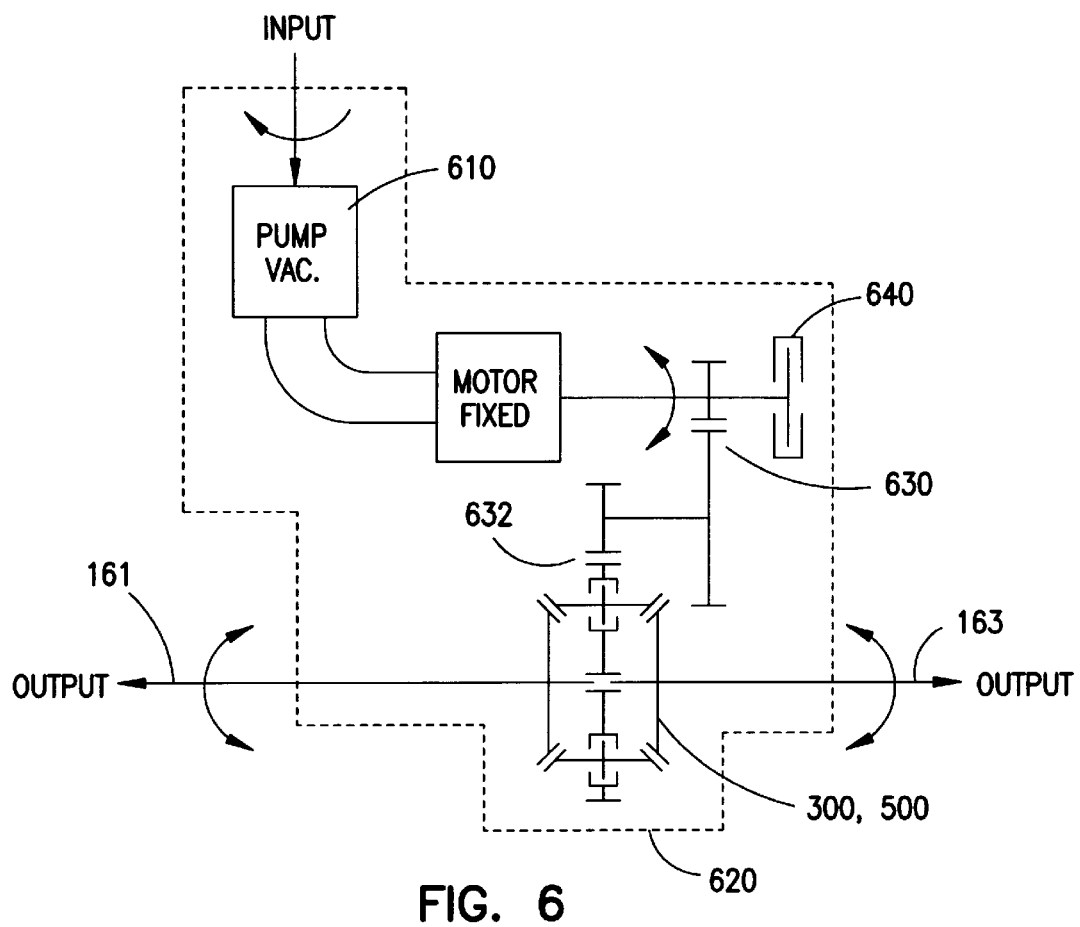
FIG. 6 is a transmission schematic diagram of HST.

FIG. 6 is a schematic diagram of a hydrostatic transmission. A variable displacement pump 610 is used to move a fluid through the housing 620 to power a fixed displacement motor of the transmission. One or two gear reductions 630 and 632 are usually required, as shown in the schematic of the hydrostatic transmission. A brake 640 is also shown. A positive support differential, such as 300 or 500, is also shown in the hydrostatic transmission. The differential 300, 500 has two outputs which correspond to the axle shafts 161 and 163 which drive the driven wheels of a tractor or other vehicle.

Figure 7:
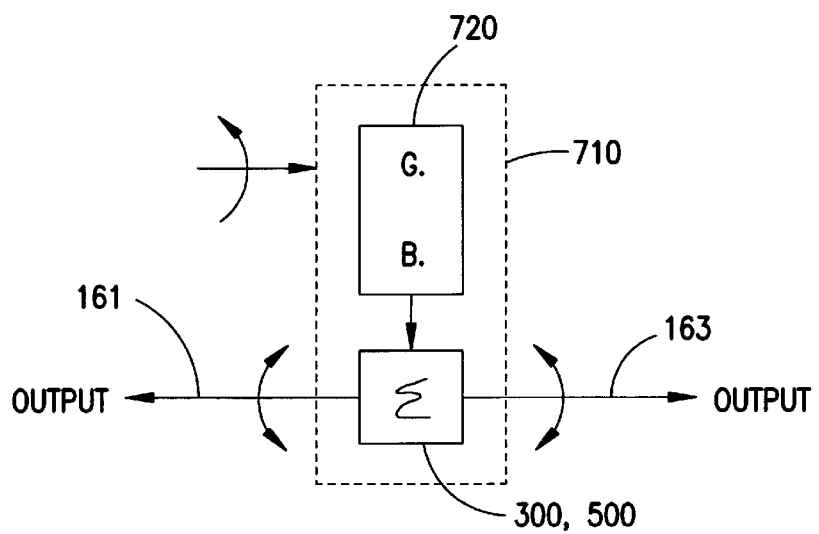
FIG. 7 is a transmission schematic diagram of mechanical transmission.

FIG. 7 shows a schematic diagram of a mechanical transmission 700. FIG. 7 includes a housing 710 for the transmission, reduction gearing 720 within the housing 710, and a differential 300, 500. The output of the gear box 720 is input to the differential 300, 500. The output of the differential 300, 500 corresponds to the driving of the half shafts 161 and 163. Thus, it is shown schematically that the positive support differential 300, 500 can be used in either a hydrostatic transmission or within a mechanical transmission.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An apparatus for driving the wheels of a vehicle comprising:
    a first axle shaft for driving a first wheel;
    a second axle shaft for driving a second wheel; and
    a differential for accommodating different lengths of travel between a first wheel and the second wheel, said differential further comprising:
        a ring gear directly supported by the first axle shaft and the second axle shaft;
        a first planet gear supported on a first planet shaft, said first planet shaft having a first end and a second end, said first end and said second end of said first planet shaft engaging the ring gear; and
        a second planet gear supported on a second planet shaft, said second planet shaft having a first end and a second end, said first end and said second end of said second planet shaft engaging the ring gear.

2. The apparatus for driving the wheels of a vehicle of claim 1, wherein the ring gear has a first opening therein, said first opening having an inside diameter that receives the end of the first axle shaft and the end of the second axle shaft.

3. The apparatus for driving the wheels of a vehicle of claim 1, wherein the first planet shaft is integral with the first planet gear, said first planet shaft being rotatably engaged with the ring gear.

4. The apparatus for driving the wheels of a vehicle of claim 3, wherein the second planet shaft is integral with the second planet gear, said second planet shaft being rotatably engaged with the ring gear.

5. The apparatus for driving the wheels of a vehicle of claim 4, wherein the ring gear includes:
   a second opening therein that receives the first integral planet shaft; and
   a third opening therein that receives the second integral plant shaft.

6. The apparatus for driving the wheels of a vehicle of claim 1, wherein the first planet gear has an opening therein for engaging the first planet shaft.

7. The apparatus for driving the wheels of a vehicle of claim 6, wherein the second planet gear has an opening therein for engaging the second planet shaft.

8. The apparatus for driving the wheels of a vehicle of claim 7, wherein the ring gear includes a first opening therein that receives the first planet shaft and allows the first planet gear to rotate about said first planet shaft, and includes a second opening therein that receives the second planet shaft and allows the second planet gear to rotate about said second shaft.

9. An apparatus for driving the wheels of a vehicle comprising:
   a first axle shaft for driving a first wheel;
   a second axle shaft for driving a second wheel; and
   a differential for accommodating different lengths of travel between a first wheel and the second wheel, said differential further comprising:
      a ring gear directly supported by the first axle shaft and the second axle shaft;
      a first planet gear supported on a first planet shaft, said first planet shaft engaging the ring gear, the first planet shaft integral with the first planet gear, said first planet shaft being rotatably engaged with the ring gear; and
      a second planet gear supported on a second planet shaft, said second planet shaft engaging the ring gear, the second planet shaft integral with the second planet gear, said second planet shaft being rotatably engaged with the ring gear;
      a first retainer which fits over the shaft of the first integral planet shaft and planet gear and fits in slots in the second opening to retain the first integral shaft and planet gear; and
      a second retainer which fits over the shaft of the integral planet shaft and planet gear and fits in slots in the third opening to retain the second integral shaft and planet gear.

10. An apparatus for driving the wheels of a vehicle comprising:
    a first axle shaft for driving a first wheel;
    a second axle shaft for driving a second wheel; and
    a differential for accommodating different lengths of travel between a first wheel and the second wheel, said differential further comprising:
       a ring gear directly supported by the first axle shaft and the second axle shaft;
       a first planet gear supported on a first planet shaft, said first planet shaft engaging the ring gear, the first planet gear having an opening therein for engaging the first planet shaft; and
       a second planet gear supported on a second planet shaft, said second planet shaft engaging the ring gear, the second planet gear having an opening therein for engaging the second planet shaft, wherein the ring gear includes a first opening therein that receives the first planet shaft and allows the first planet gear to rotate about said first planet shaft, and includes a second opening therein that receives the second planet shaft and allows the second planet gear to rotate about said second shaft, and wherein the first planet shaft and the second planet shaft include a flat surface on at least one end of each of the first planet shaft and the second planet shaft, said ring gear having a slot therein for receiving the flat surface, said flat surface preventing the rotation of the first planet shaft and the second planet shaft while the first planet gear and the second planet gear rotate on said shafts.

11. The apparatus for driving the wheels of a vehicle of claim 10, wherein the first planet shaft and the second planet shaft are engaged within the ring gear so that the axis of the first planet shaft and the axis of the second planet shaft are substantially along a diameter of the ring gear.

12. A vehicle comprising:
    a frame;
    an engine attached to said frame;
    a first wheel;
    a second wheel;
    a first axle shaft attached to said first wheel;
    a second axle shaft attached to said second wheel;
    a transmission for transmitting power from the engine to the first axle shaft and the second axle shaft for driving the first and second wheels; and
    a differential for accommodating different lengths of travel between said first wheel and said second wheel, said differential further comprising:
       a ring gear directly supported by the first axle shaft and the second axle shaft;
       a first planet gear supported on a first planet shaft, said first planet shaft having a first end and a second end, said first end and said second end of said first planet shaft engaging the ring gear; and
       a second planet gear supported on a second planet shaft, said second planet shaft having a first end and a second end, said first end and said second end of said second planet shaft engaging the ring gear.

13. The vehicle of claim 12, wherein the transmission is a hydrostatic transmission.

14. The vehicle of claim 12, wherein the transmission is a mechanical transmission.

15. The vehicle of claim 12, wherein the axis of first planet shaft and the axis of the second planet shaft are substantially colinear.

16. The vehicle of claim 12, wherein the axis of first planet shaft and the axis of the second planet shaft are substantially colinear and wherein the line corresponding to the axis of the first planet shaft and the axis of the second planet shaft passes through the center of said ring gear.

17. The vehicle of claim 12, wherein the first planet gear and second planet gear are supported on the ring gear.

* * * * *

(12) EX PARTE REEXAMINATION CERTIFICATE (5133rd)
United States Patent
Gafvert

(10) Number: US 5,980,416 C1
(45) Certificate Issued: Jul. 5, 2005

(54) DIFFERENTIAL FOR A VEHICLE

(75) Inventor: Sven B. Gafvert, Eden Prairie, MN (US)

(73) Assignees: Rolf Gafvert, Sugarland, TX (US); Ulf Gafvert, Washbarn, WI (US)

Reexamination Request:
No. 90/006,040, Jun. 20, 2001

Reexamination Certificate for:
Patent No.: 5,980,416
Issued: Nov. 9, 1999
Appl. No.: 08/906,777
Filed: Aug. 6, 1997

(51) Int. Cl.$^7$ ............................................. F16H 48/06
(52) U.S. Cl. ........................ 475/230; 475/248; 475/331
(58) Field of Search ................................. 475/230, 246

(56) References Cited

U.S. PATENT DOCUMENTS

| | | |
|---|---|---|
| 50,969 A | 11/1865 | Warner |
| 194,980 A | 9/1877 | Whitehead |
| 421,902 A | 2/1890 | Britz |
| 2,431,272 A | 11/1947 | Mynssen et al. ............... 74/315 |
| 2,608,261 A | * 8/1952 | Blazier ........................ 475/230 |
| 4,602,527 A | 7/1986 | Tamiya ........................... 74/713 |
| 5,447,028 A | 9/1995 | Azuma et al. ................. 60/487 |
| 5,799,486 A | 9/1998 | Takada et al. ................. 60/464 |
| 5,809,845 A | 9/1998 | Shimizu .................... 74/606 R |
| 5,980,416 A | 11/1999 | Gafvert ....................... 475/230 |
| 6,015,362 A | 1/2000 | Irikura et al. ................ 475/231 |

\* cited by examiner

*Primary Examiner*—Dirk Wright

(57) ABSTRACT

A vehicle, such as a lawn mower or garden tractor, includes an engine attached to a frame. The frame includes several wheels including two driven wheels. A first axle shaft is attached to the first driven wheel. A second axle shaft attached to the second driven wheel. The vehicle has a transmission for transmitting power from the engine to the first axle shaft and the second axle shaft for driving the first and second wheels. The transmission includes a differential for accommodating different lengths of travel between said first wheel and said second wheel, such as when the vehicle makes a turn. The differential includes a ring gear supported by the first axle shaft and the second axle shaft. A first planet gear is supported on the first planet shaft. The first planet shaft is attached to the ring gear. Similarly, a second planet gear supported on a second planet shaft. The second planet shaft is also attached to the ring gear.

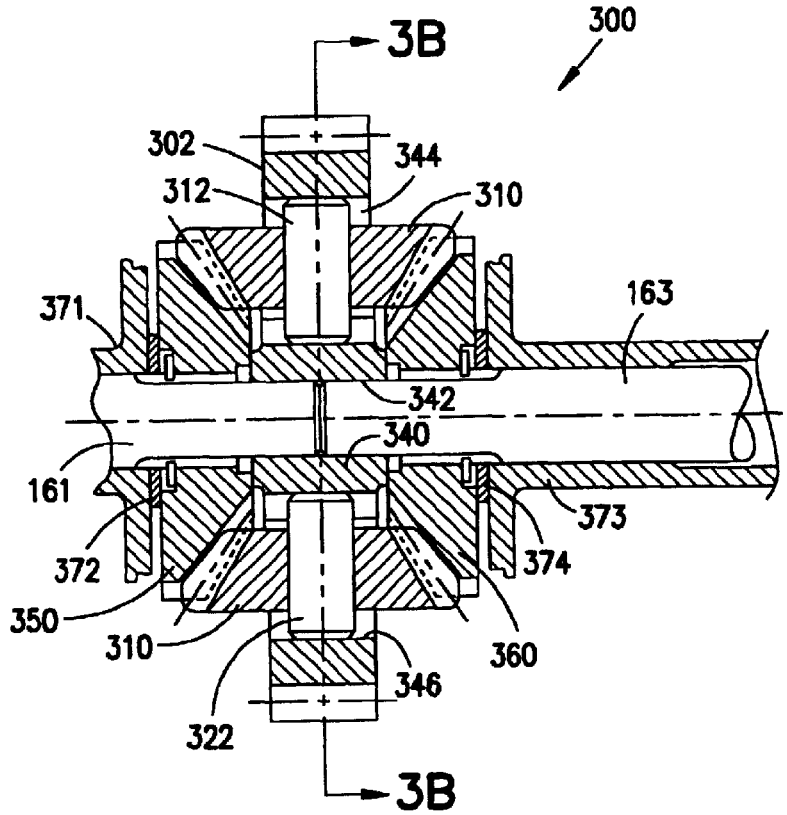

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–11 is confirmed.

Claims 1–8 and 12–17 are cancelled.

\* \* \* \* \*